(12) United States Patent
Baick et al.

(10) Patent No.: US 11,128,902 B2
(45) Date of Patent: Sep. 21, 2021

(54) METHOD, SYSTEM, AND NON-TRANSITORY COMPUTER READABLE RECORD MEDIUM FOR VIDEO QUALITY CONTROL

(71) Applicant: LINE CORPORATION, Tokyo (JP)

(72) Inventors: Joonsick Baick, Seongnam-si (KR); Geum Yong Yoo, Seongnam-si (KR)

(73) Assignee: LINE CORPORATION, Tokyo (JP)

(*) Notice: Subject to any disclaimer, the term of this patent is extended or adjusted under 35 U.S.C. 154(b) by 0 days.

(21) Appl. No.: 16/813,123

(22) Filed: Mar. 9, 2020

(65) Prior Publication Data

US 2020/0213635 A1 Jul. 2, 2020

Related U.S. Application Data

(63) Continuation of application No. PCT/KR2017/009859, filed on Sep. 8, 2017.

(51) Int. Cl.
*H04N 7/173* (2011.01)
*H04N 21/238* (2011.01)
*H04N 21/24* (2011.01)
*H04N 21/434* (2011.01)
*H04N 21/44* (2011.01)
*H04N 21/442* (2011.01)

(Continued)

(52) U.S. Cl.
CPC ....... *H04N 21/238* (2013.01); *H04N 21/2402* (2013.01); *H04N 21/434* (2013.01); *H04N 21/44* (2013.01); *H04N 21/44209* (2013.01); *H04N 21/4621* (2013.01); *H04N 21/8455* (2013.01)

(58) Field of Classification Search
CPC ............. H04N 21/238; H04N 21/2402; H04N 21/434; H04N 21/44; H04N 21/44209; H04N 21/4621; H04N 21/8455; H04N 21/2662; H04N 21/234381; H04N 21/2365
USPC ............................................................ 725/9
See application file for complete search history.

(56) References Cited

U.S. PATENT DOCUMENTS 5,477,542 A * 12/1995 Takahara ................. H04J 3/177
348/14.05
6,292,834 B1 * 9/2001 Ravi ................. H04L 29/06027
375/E7.004

(Continued)

FOREIGN PATENT DOCUMENTS

JP 5984462 B2 9/2016
KR 10-0144260 B1 7/1998

(Continued)

OTHER PUBLICATIONS

International Search Report for PCT/KR2017/009859 dated Jun. 5, 2018 (PCT/ISA/210).

*Primary Examiner* — Michael B. Pierorazio
(74) *Attorney, Agent, or Firm* — Sughrue Mion, PLLC

(57) ABSTRACT

Provided are a method, a system, and a non-transitory computer readable record medium for video quality control. A quality control method may include: receiving a video stream including frames classified into a plurality of frame types based on a reference relationship between the frames for decoding; selecting a frame type among the plurality of frame types; and controlling a quality of the video stream by multiplexing the frames included in the video stream and by outputting one or more of the frames that have the selected frame type.

13 Claims, 9 Drawing Sheets

(51) Int. Cl.
*H04N 21/462* (2011.01)
*H04N 21/845* (2011.01)

(56) References Cited

U.S. PATENT DOCUMENTS

| | | | | |
|---|---|---|---|---|
| 6,728,965 | B1* | 4/2004 | Mao | H04N 7/17336 725/38 |
| 7,224,837 | B2* | 5/2007 | Olshansky | H04N 21/2365 348/423.1 |
| 7,237,251 | B1* | 6/2007 | Oz | H04N 21/8166 725/40 |
| 7,571,246 | B2* | 8/2009 | Virdi | H04N 21/23611 709/232 |
| 8,023,511 | B2* | 9/2011 | Komiya | H04Q 11/0067 370/390 |
| 8,249,141 | B1* | 8/2012 | Harris | H04N 21/8455 375/240.01 |
| 8,380,790 | B2* | 2/2013 | Lee | H04L 12/1827 709/205 |
| 8,925,021 | B2* | 12/2014 | Ma | H04L 67/02 725/90 |
| 8,990,351 | B2* | 3/2015 | Isaksson | H04L 47/30 709/219 |
| 9,106,787 | B1* | 8/2015 | Holmer | H04L 47/2416 |
| 9,226,022 | B2* | 12/2015 | Ferguson | H04N 21/44016 |
| 2006/0080724 | A1* | 4/2006 | Vermeiren | H04N 5/50 725/131 |
| 2010/0017443 | A1* | 1/2010 | Xie | H04L 67/1095 707/E17.007 |
| 2010/0037267 | A1* | 2/2010 | Bennett | H04N 21/8549 725/56 |
| 2013/0014156 | A1* | 1/2013 | Seo | H04N 21/4384 725/32 |
| 2018/0139496 | A1* | 5/2018 | Gustafsson | H04N 21/23418 |
| 2019/0335209 | A1* | 10/2019 | Birrer | H04N 21/8455 |

FOREIGN PATENT DOCUMENTS

| | | |
|---|---|---|
| KR | 10-2007-0048095 A | 5/2007 |
| KR | 10-2013-0070566 A | 6/2013 |
| KR | 10-2015-0126860 A | 11/2015 |
| KR | 10-2016-0146542 A | 12/2016 |

* cited by examiner

METHOD, SYSTEM, AND NON-TRANSITORY COMPUTER READABLE RECORD MEDIUM FOR VIDEO QUALITY CONTROL

CROSS-REFERENCE TO RELATED APPLICATION

This application is a continuation application of International Application No. PCT/KR2017/009859, filed on Sep. 8, 2017, the disclosure of which is incorporated herein by reference in its entirety.

BACKGROUND

1. Field

Apparatuses and methods consistent with example embodiments relate to video quality control, and more particularly, to a video quality control method for providing a video using a plurality of qualities by controlling a quality of a video to be provided without transcoding the video, a computer apparatus for performing the quality control method, and a non-transitory computer-readable record medium for implementing the video quality control method in a computer in conjunction with the computer.

2. Description of Related Art

Technology that allows a server to receive a video provided from a broadcast sender and to transmit the received video to a plurality of broadcast recipients. Here, a transcoding process may need to be performed on a server side to provide the plurality of broadcast recipients with the video having a single quality from the broadcast sender as the video having a plurality of qualities based on needs of the broadcast recipients. For example, it may be assumed that the broadcast sender transmits a video at a resolution of 720p. Here, the number "720" in 720p denotes 720 lines of a vertical resolution and the character "p" denotes progressive. That is, the video with the resolution of 720p may refer to a high definition (HD) video having a resolution of 1280×720. Here, when a server supports a video to be transmitted at a resolution, for example, a total of three qualities including 720p, 480p, and 360p, for broadcast viewers, the server needs to transcode the video transmitted at the resolution of 720p from the broadcast sender to three videos of 720p, 480p, and 360p.

However, according to a transcoding method for retransmitting a digital multimedia broadcast stream in the related art, a transcoding process itself requires a relatively large amount of server resources. For example, compared to an amount of server resources used for simply multiplexing frames included in a video of a broadcast sender, hundreds of times or more server resources are required to transcode the video. Accordingly, a great amount of resources are required on a server to perform transcoding to provide a video using a variety of quality to broadcast recipients.

SUMMARY

Example embodiments address at least the above problems and/or disadvantages and other disadvantages not described above. Also, the example embodiments are not required to overcome the disadvantages described above, and may not overcome any of the problems described above.

Example embodiments provide a video quality control method for providing a video using a plurality of qualities by controlling a quality of a video through multiplexing of frames of the video without transcoding the video, a computer apparatus for performing the video quality control method, and a non-transitory computer-readable record medium for implementing the video quality control method in a computer in conjunction with the computer.

According to an aspect of an example embodiment, there is provided a video quality control method including: receiving a video stream including frames that are classified into a plurality of frame types based on a reference relationship between the frames with regard to decoding; selecting a frame type among the plurality of frame types; and controlling a quality of the video stream by multiplexing the frames included in the video stream and by outputting one or more of the frames that have the selected frame type.

The plurality of frame types may include a first frame type indicating that a corresponding frame is independently decoded without referring to other frames, a second frame type indicating that the corresponding frame is decoded with reference to a preceding frame, and a third frame type indicating that the corresponding frame is decoded with reference to the preceding frame and a subsequent frame.

The controlling of the quality of the video stream may include: providing the video stream with a first quality by outputting the frames of the first frame type, the second frame type, and the third frame type through a first channel; providing the video stream with a second quality by outputting the frames of the first frame type and the second frame type through a second channel; and providing the video stream with a third quality by outputting the frames of the first frame type through a third channel.

The receiving of the video stream may include receiving the frames of the video stream that are encoded at a terminal of a sender and transmitted over a network, and the quality control method may further include relaying the video stream of which the quality is controlled by transmitting the one or more of the frames having the selected frame type through a channel accessible by a terminal of a viewer.

The video quality control method may further include transmitting the one or more of the frames having the selected frame type to a monitoring terminal for monitoring or inspecting the video stream.

According to an aspect of another example embodiment, there is provided a non-transitory computer-readable record medium storing computer instructions that, when executed by a processor, cause the processor to perform the video quality control method.

According to an aspect of another example embodiment, there is provided a computer apparatus including: at least one processor configured to execute computer-readable instructions, wherein the at least one processor is configured to receive a video stream including frames that are classified into a plurality of frame types based on a reference relationship between the frames with regard to decoding; select a frame type among the plurality of frame types; and control a quality of the video stream by multiplexing the frames included in the video stream and by outputting one or more of the frames that have the selected frame type.

The plurality of frame types may include a first frame type indicating that a corresponding frame is independently decoded without referring to other frames, a second frame type indicating that the corresponding frame is decoded with reference to a preceding frame, and a third frame type indicating that the corresponding frame is decoded with reference to the preceding frame and a subsequent frame.

The at least one processor may be further configured to provide the video stream with a first quality by outputting the frames of the first frame type, the second frame type, and the third frame type through a first channel, provide the video stream with a second quality by outputting the frames of the first frame type and the second frame type through a second channel, and provide the video stream with a third quality by outputting the frames of the first frame type through a third channel.

The at least one processor may be further configured to receive the frames of the video stream that are encoded at a terminal of a sender and transmitted over a network, and relay the video stream of which the quality is controlled by transmitting the one or more of the frames having the selected frame type being through a channel accessible by a terminal of a viewer.

The at least one processor may be further configured to transmit the one or more of the frames having the selected frame type to a monitoring terminal for monitoring or inspecting the video stream.

According to an aspect of another example embodiment, there is provided a server for providing a video stream to a client device, the server including: a memory configure to store computer-readable instructions; and at least one processor configured to execute the computer-readable instructions to: receive a video stream including a plurality of frames having a plurality of different frame types; selecting a frame type among the plurality of different frame types based on a network state between the server and the client device; and selectively transmit one or more of the plurality of frames according to the selected frame type.

The plurality of frames may include intra frames (I-frames), predictive frames (P-frames), and bidirectional predictive frames (B-frames).

The at least one processor may be further configured to execute the computer-readable instructions to: set a quality of the video stream to be transmitted to the client device, to a first video quality, a second video quality, or a third video quality, according to the network state; transmit the I-frames, the P-frames, and the B-frames to the client device, in response to the quality of the video stream being set to the first video quality; transmit the I-frames and the P-frames to the client device without transmitting the B-frame, in response to the quality of the video stream being set to the second video quality; and transmit the I-frames to the client device without transmitting the P-frames and the B-frames, in response to the quality of the video stream being set to the third video quality.

The at least one processor may be further configured to execute the computer-readable instructions to: determine the network state based on information of a traffic delay provided from the client device.

The at least one processor may include a network state monitor configured to monitor the video stream and determine the network state based on the monitored video stream.

The at least one processor may be further configured to execute the computer-readable instructions to: communicate with a monitoring terminal configured to monitor the video stream and determine the network state based on the monitored video stream; and receive information of the network state from the monitoring terminal.

BRIEF DESCRIPTION OF THE FIGURES

The above and/or other aspects will be more apparent by describing certain example embodiments, with reference to the accompanying drawings, in which.

DETAILED DESCRIPTION

Figure 1:
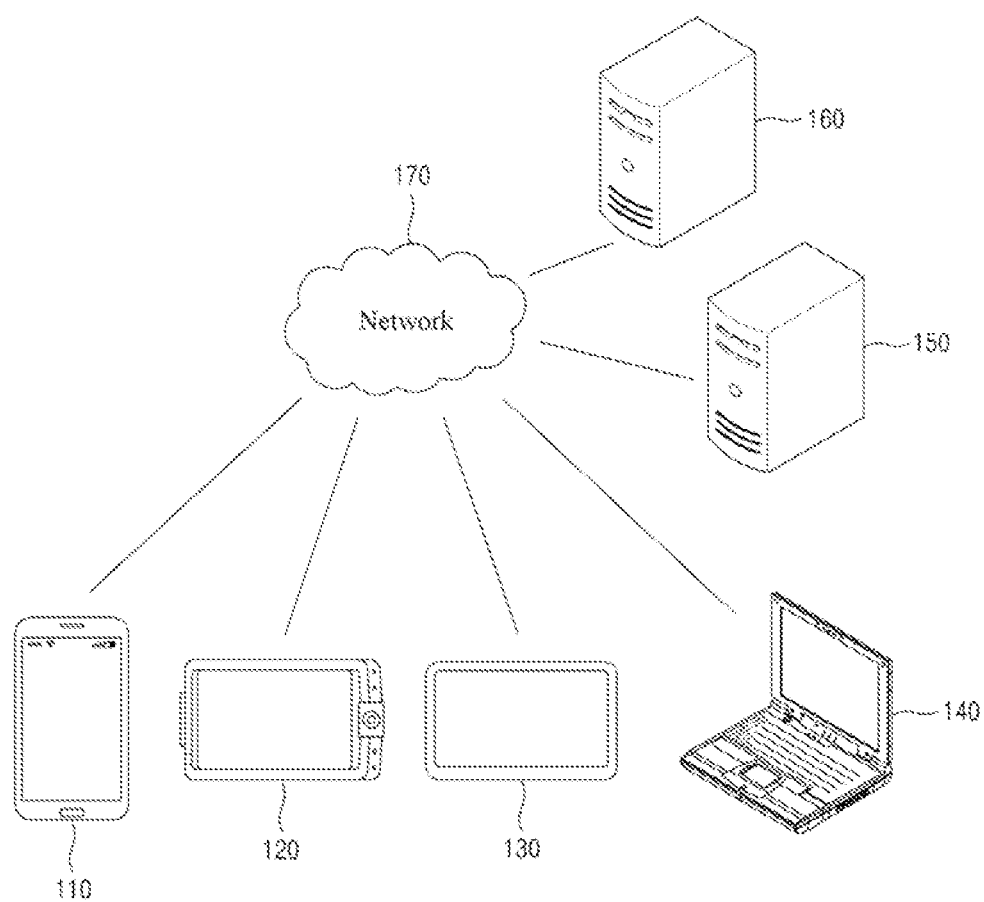
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A quality control method according to example embodiments may be performed through a computer apparatus, such as, for example, an electronic device or a server, which is described below. Here, a computer program according to an example embodiment may be installed and executed on the computer apparatus and the computer apparatus may perform the call quality method under control of the executed computer program. The aforementioned computer program may be stored in a non-transitory computer-readable record medium to implement the call quality method on a computer in conjunction with the computer apparatus. For example, the server may provide a video using a plurality of qualities by controlling a quality of a video provided from a broadcast sender using a muxing scheme without transcoding the video. Depending on example embodiments, the electronic device may control a quality of a specific video using the muxing scheme.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), Internet, and the like. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide a service (e.g., a broadcast transmission service, a content transmission service, an information providing service, a messaging service, a mail service, etc.) intended by an application through the application as a computer program installed and executed on the plurality of electronic devices 110, 120, 130, and 140, as the first service. As another example, the server 160 may provide the plurality of electronic devices 110, 120, 130, and 140 with a service that distributes a file for installing and executing the application, as the second service.

Figure 2:
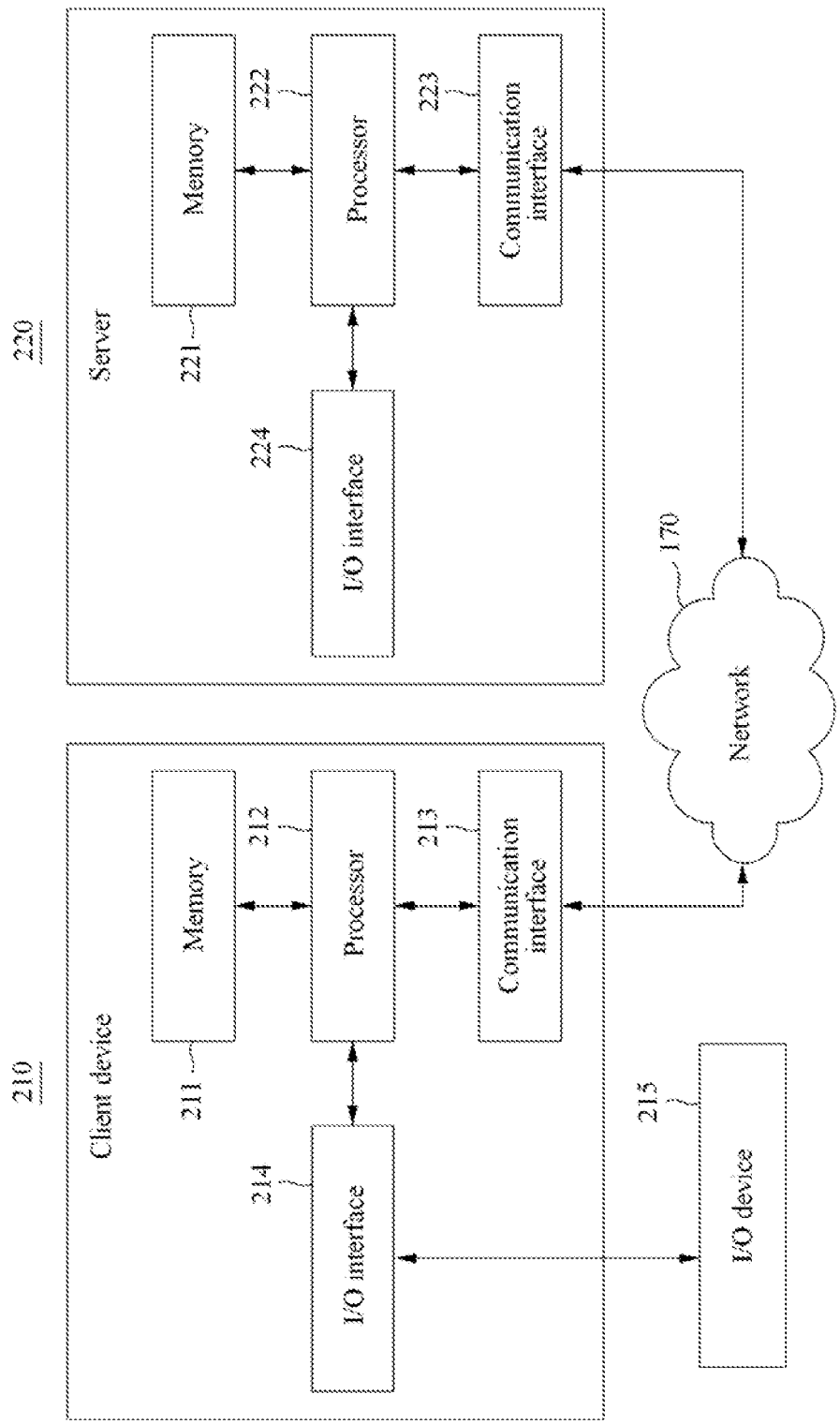
FIG. 2 is a diagram illustrating an example of an electronic device and a server according to at least one example embodiment.

FIG. 2 is a block diagram illustrating an example of a client device 210 and a server 220 according to example embodiments. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, etc., as a non-transitory computer-readable record medium. The permanent mass storage device, such as ROM and disk drive, may be included in the client device 210 or the server 220 as a permanent storage device separate from the memory 211, 221. Also, an OS or at least one program code (e.g., a code for a browser installed and executed on the client device 210 or an application installed and executed on the client device 210 to provide a specific service) may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device (e.g., the electronic device 120), or another server (e.g., the server 160), and/or between the server 220 and another electronic device or server. For example, the processor 212 of the client device 210 may transfer a request created based on a program code stored in the storage device such as the memory 211, to the server 220 over the network 170 under control of the communication interface 213. The client device 210 may receive a control signal, an instruction, content, a file, etc., provided under control of the processor 222 of the server 220 through the communication interface 213 of the electronic device 1 110, from the communication interface 223 of the server 220. For example, a control signal, an instruction, content, a file, etc., of the server 220 received through the communication interface 213 may be transferred to the processor 212 or the memory 211, and content, a file, etc., may be stored in a storage medium, for example, the permanent storage device, further includable in the client device 210

The I/O interface 214 may be a device used for interface with an I/O apparatus 215. For example, an input device may include a device, such as a keyboard, a mouse, etc., and an output device may include a device, such as a display, a speaker, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 221, content or a service screen configured based on data provided from the server 220 or another client device (e.g., the electronic device 120) may be displayed on the display through the I/O interface 214.

According to other example embodiments, the client device 210 and the server 220 may include a smaller or greater number of components than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
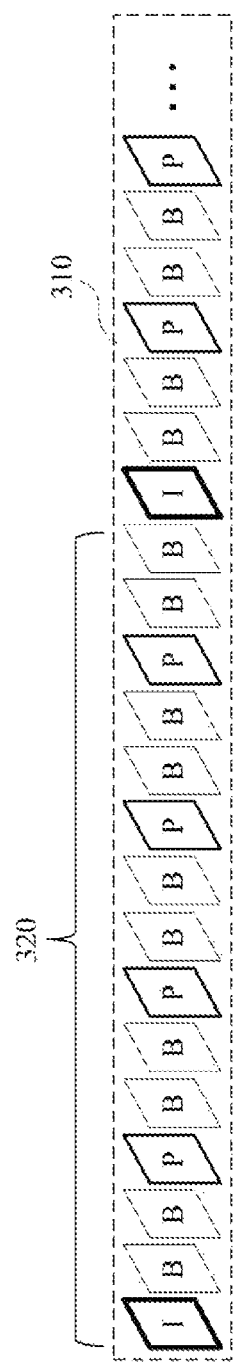
FIG. 3 illustrates an example of frames of a video stream being published according to at least one example embodiment.
Figure 4:
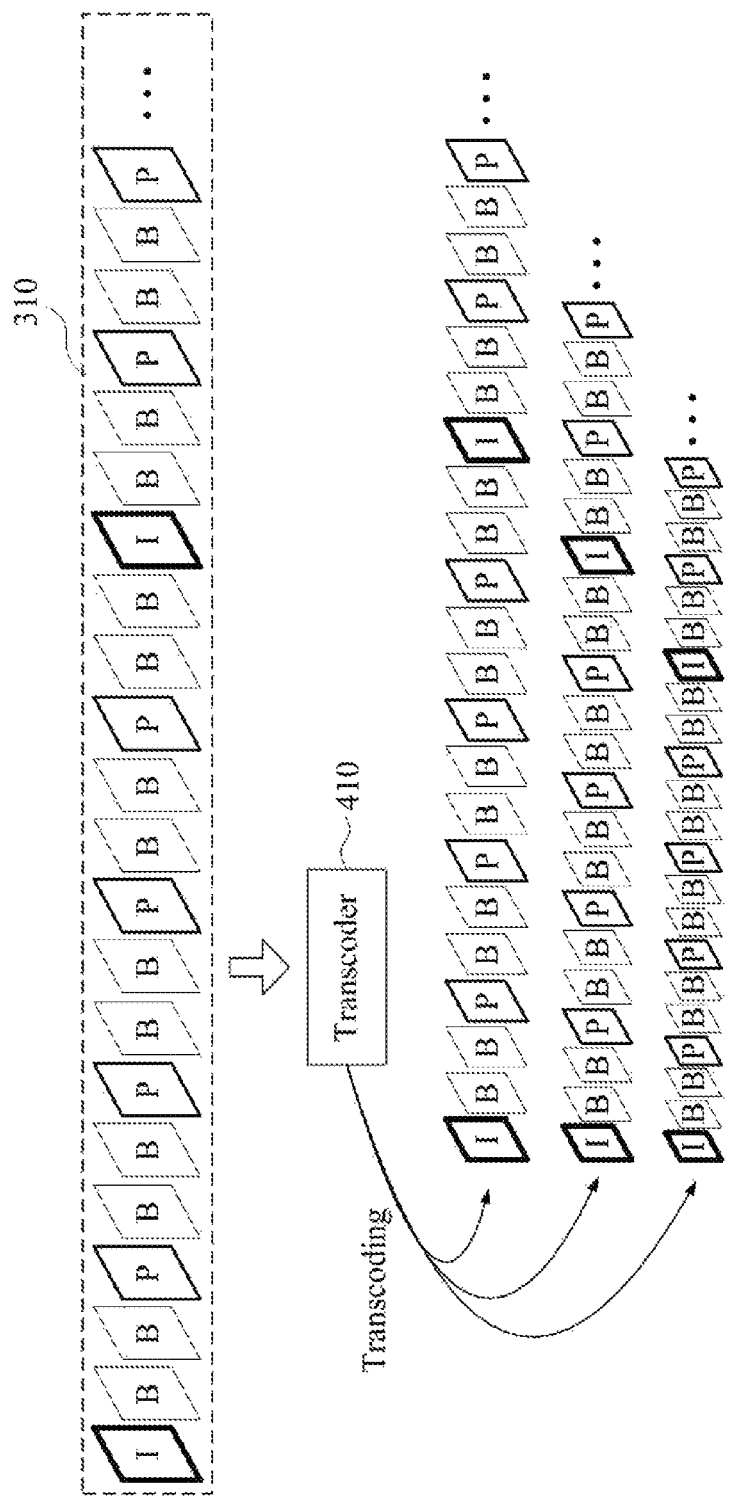
FIGS. 4 and 5 illustrate examples of comparing a transcoding according to the related art and a multiplexing according to at least one example embodiment.
Figure 5:
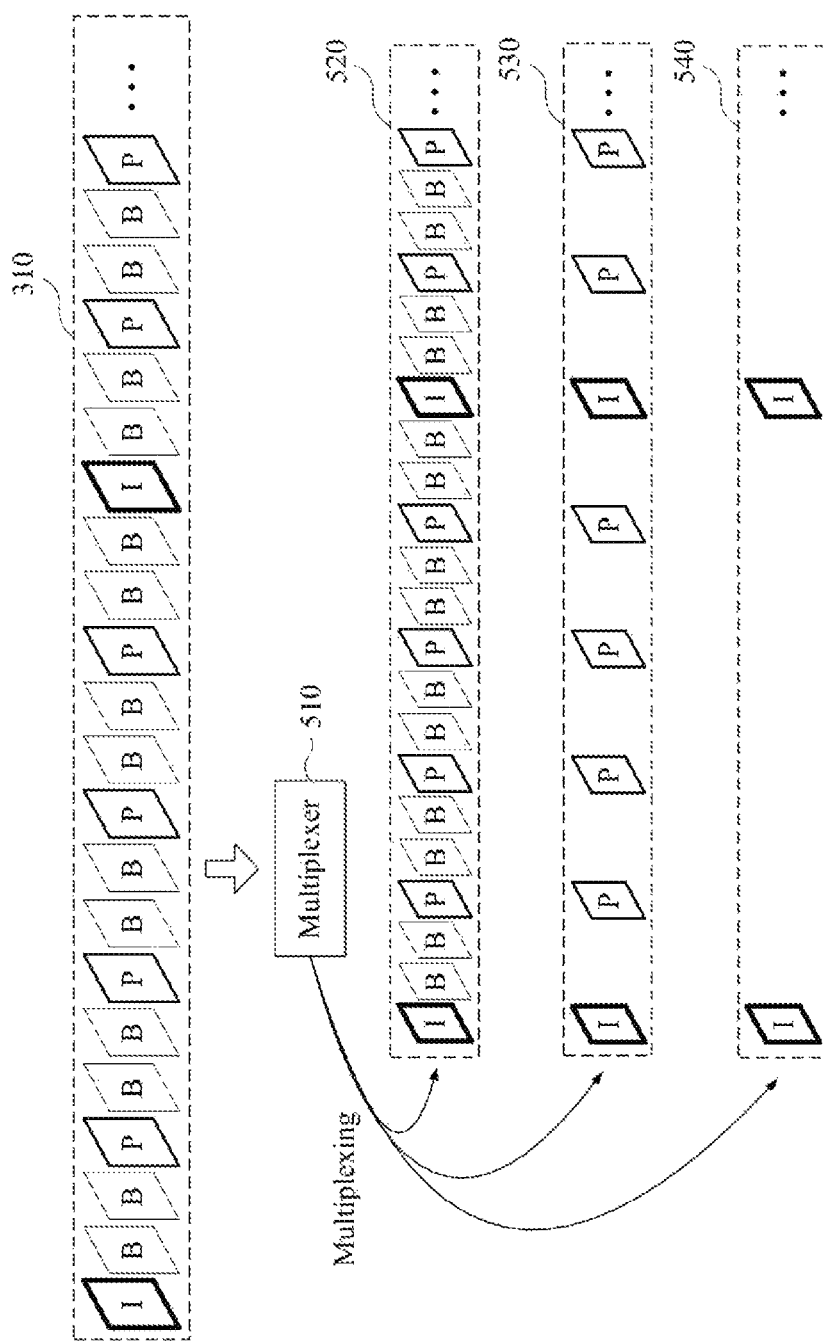

FIG. 3 illustrates an example of frames of a video stream being published according to at least one example embodiment, and FIGS. 4 and 5 illustrate examples of comparing a transcoding according to the related art and a multiplexing according to at least one example embodiment.

Referring to FIG. 3, a first box 310 indicated with dotted lines represents an example of video frames. The types of video frames may include an intra frame (I-frame) (key frame), a predictive frame (P-frame), and a bidirectional predictive frame (B-frame). In FIG. 3, "I" represents an I-frame, "P" represents a P-frame, and "B" represents a B-frame.

An I-frame refers to a frame that is independently encoded and a frame that is independently decodable without referring to another frame. The I-frame may be formed as a complete image.

A P-frame refers to a frame that is encoded by referring to a previous frame and a frame that is decodable only when a previous P-frame or a previous I-frame is present. The P-frame may include only the changes between a previous frame and a current frame. For example, when an object moves in a scene, the P-frame may contain only the movement of the object without storing the values of the unchanging background pixels.

A B-frame refers to a frame that is encoded by referring to a previous frame and a subsequent frame and a frame that is decodable only when a P-frame or an I-frame is present before and after the B-frame. The B-frame may include differences between a current frame and a previous frame, and the current frame and a subsequent frame.

Here, frames of a video stream being published may be provided in a form that a pattern 320 of frames is repeated. A number of frames that continue in the pattern 320 may be different. For example, three B-frames instead of two B-frames may be present between an I-frame and a P-frame or between P-frames.

FIG. 4 illustrates an example in which a transcoder 410 provides videos having different qualities by transcoding frames of the video stream included in the first box 310. The transcoder 410 may be implemented as a processor and may be included in the server 220. Transcoding refers to a technique for processing, selecting, and converting multimedia content, for example, video, data, and video, etc., produced for a single environment to be available in another environment. Referring to FIG. 4, a video stream having a total of three qualities may be provided by changing a resolution of each of the frames of the video stream.

FIG. 5 illustrates an example in which a multiplexer 510 provides a video using different qualities by multiplexing the frames of the video stream included in the first box 310. The multiplexer 510 may be implemented as a processor and may be included in the server 220. Here, while the transcoder 410 of FIG. 4 may control a bitrate by adjusting a resolution of each of the frames, the multiplexer 510 of FIG. 5 may control a bitrate through a temporal scalability of controlling a frame rate.

For example, referring to FIG. 5, a second box 520 indicated with dotted lines represents an example in which the multiplexer 510 receives the frames of the video stream included in the first box 310 and sequentially outputs all of the frames in the order in which the frames are received. Also, a third box 530 indicated with dotted lines represents an example in which the multiplexer 510 receives the frames of the video stream included in the first box 310 and outputs only I-frames and P-frames excluding B-frames. Likewise, a fourth box 540 indicated with dotted lines represents an example in which the multiplexer 510 receives the frames of the video stream included in the first box 310 and outputs only the I-frames. The multiplexer 510 may filter out the B-frames to output only the I-frames and P-frames as shown in the third box 530, and may filter out the B-frames and P frames to output only the I-frames as shown in the fourth box 540.

As described above, an I-frame or a P-frame may be decoded without any influence from an absence of a B-frame. That is, since the B-frame is not referred to by other frames, a video stream may be decoded although the B-frame is removed from the video stream. Therefore, if B-frames are removed from the video-stream as shown in the third box 530, a bitrate may decrease and a video with a relatively low quality compared to that of the video stream of the first box 310 or the video stream of the second box 520 may be serviced.

Likewise, since an I-frame is also independently encoded and decoded, the I-frame may be decoded without any influence from an absence of a P-frame or a B-frame. Therefore, if P-frames or B-frames are removed from the video stream as shown in the fourth box 540, a bitrate may decrease and a video with a relatively low quality compared to that of the video stream of the third box 530 may be serviced.

As described above, example embodiments may provide a video having various qualities by simply selecting and outputting packets of a video stream provided through multiplexing based on a type, without transcoding, such as, for example, controlling a resolution of each of the frames. Here, an example in which, since a video stream is in a structure in which a B-frame refers to a P-frame or an I-frame and a P-frame refers to another P-frame or an I-frame, a video is provided using three qualities are provided by sequentially excluding a frame not referred to is described with reference to FIG. 5. However, although a gradual reference further increases in response to an increase in types of frames, a video may be provided using a larger number of qualities. For example, with the assumption that "A→B" represents that a frame of an A type is encoded and decoded by referring to a frame of a B type and types of frames of five stages such as "A→B→C→D→E" are present, a video stream generated based thereon may be provided. In this case, the multiplexer 510 may provide a video having five qualities, for example, a first quality of a video stream including all types of frames, a second type of a video stream excluding frames of A type, a third quality of a video stream excluding frames of A type and B type, and a fourth quality of video stream excluding frames of A type, B type, and C type, and a fifth quality of a video stream including only frames of E type.

As described above, the example embodiments may control a quality of a video without transcoding by multiplexing frames based on a reference relationship between the frames. Meanwhile, the example embodiments are described based on examples of controlling a quality of a video stream by adjusting a bitrate through adjustment of a frame rate based on a video frame characteristic. A bitrate of the video stream may affect the quality of the video on a receiving side, such as a broadcast viewer that receives the video stream.

Figure 6:
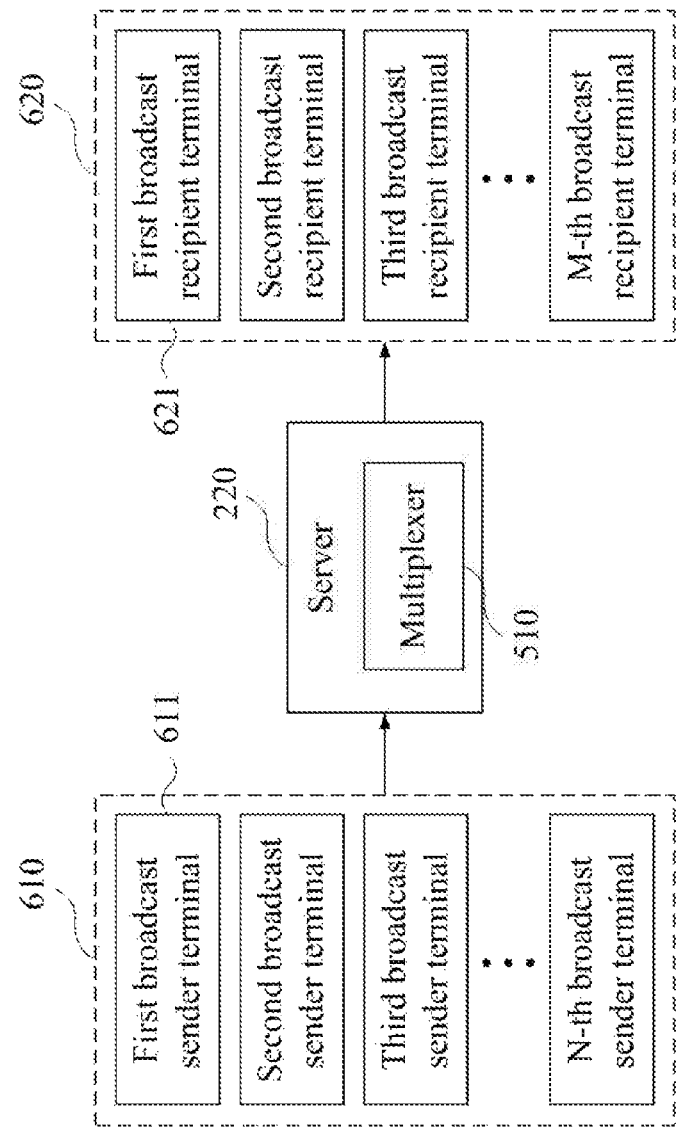
FIG. 6 illustrates an example of an environment of providing a video stream by controlling a quality of the video stream according to at least one example embodiment.

FIG. 6 illustrates an example of a system of providing a video stream by controlling a quality of the video stream according to at least one example embodiment. FIG. 6 illustrates an example of a live broadcast service environment in which the server 220 relays live video streams transmitted from N broadcast sender terminals 610 to M broadcast recipient terminals 620. Here, each of N and M denotes a natural number. Also, each of the N broadcast sender terminals 610 and each of the M broadcast recipient terminals 620 may be configured through a computer apparatus, for example, the client device 210.

The server 220 may receive live video streams transmitted from the respective N broadcast sending terminals 610, and may broadcast the received live video streams by controlling a quality of each of the live video streams using the multiplexer 510. For example, if it is possible to transmit a single live video stream using a total of three qualities, the server 220 may broadcast live video streams through Nx3 channels.

Here, each of the M broadcast recipient terminals 620 may view a live video stream with a selected quality through a channel of a desired quality among three channels for each quality with respect to the desired live video stream.

In detail, a first broadcast sender terminal 611 may transmit a live video stream A. In this case, the server 220 may multiplex the lived video stream A being transmitted through the multiplexer 510 in real time, and may broadcast a first quality live video stream A including all of I-frames, P-frames, and B-frames through a first channel, a second quality live video stream A including I-frames and P-frames excluding B-frames through a second channel, and a third quality live video stream A including I-frames excluding all of B-frames and P-frames through a third channel. Here, a first broadcast recipient terminal 621 may provide a user interface capable of selecting a single channel from among the first channel, the second channel, and the third channel in association with the live video stream A. Also, the first broadcast recipient terminal 621 may play the second quality live video stream A being streamed through a channel, for example, the second channel, selected based on the user interface.

As described above, an amount of resources of the server 220 required may differ between transcoding and multiplexing by hundreds of times or more. The difference may increase according to an increase in N in the live broadcast service environment of FIG. 6. That is, the server 220 may significantly reduce an amount of server resources required by controlling a quality of a live video stream through multiplexing without transcoding.

Figure 7:
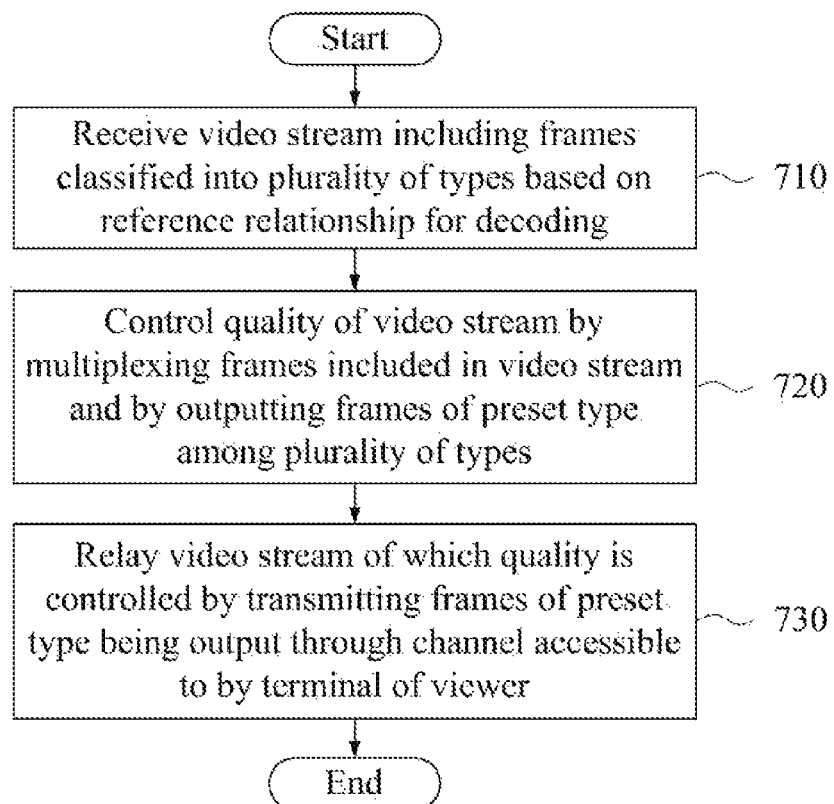
FIG. 7 is a flowchart illustrating an example of a quality control method according to at least one example embodiment.

FIG. 7 is a flowchart illustrating an example of a quality control method according to at least one example embodiment. The quality control method of FIG. 7 may be performed by a computer apparatus, such as the server 220. For example, the processor 222 of the server 220 may be configured to execute control instructions according to a code of at least one program or a code of an OS included in the memory 221. Here, the processor 222 may control the server 220 to perform operations 710 to 730 included in the quality control method of FIG. 7 in response to a control instruction provided from a code stored in the server 220.

Referring to FIG. 7, in operation 710, the server 220 may receive a video stream including frames classified into a plurality of types based on a reference relationship for decoding. For example, in the case of a live broadcast described above with reference to the example embodiment of FIG. 6, the server 220 may receive frames of a video stream that are encoded at a terminal of a sender and being transmitted live over a network. Here, the plurality of types may include a first type for a frame that is independently decoded and referred to for decoding of another frame, a second type for a frame that is decoded by referring to another frame and referred to for decoding of another frame, and a third type for a frame that is decoded by referring to another frame and not referred to for decoding of another frame. For example, a frame of the first type may be independently decoded without referring to another frame, such as the aforementioned I-frame. Also, a frame of the second type may be decoded by referring to a previously encoded frame of the first type or the second type, such as the aforementioned P-frame. Also, a frame of the third type may be decoded by referring to all of the previously encoded frame of the first type or the second type and a subsequently encoded frame of the first type or the second type, such as the aforementioned B-frame.

In operation 720, the server 220 may control a quality of the video stream by multiplexing the frames comprised in the video stream and by outputting frames of a preset type among the plurality of types. For example, the server 220 may provide a video stream using three qualities by multiplexing the frames included in the video stream. In this case, the server 220 may provide a video stream with a first quality by outputting frames of the first type, the second type, and the third type through a first channel, may provide a video stream with a second quality by outputting the frames of the first type and the second type through a second channel, and may provide a video stream with a third quality by outputting the frames of the first type through a third channel.

In operation 730, the server 220 may relay the video stream of which the quality is controlled by transmitting frames of a preset type being output through a channel accessible to by a terminal of a viewer. For example, the server 220 may transmit the video stream with the first quality through the first channel, the video stream with the second quality through the second channel, and the video stream with the third quality through the third channel. In this case, the terminal of the viewer may be provided with a video stream of a desired quality through access to a desired channel.

Figure 8:
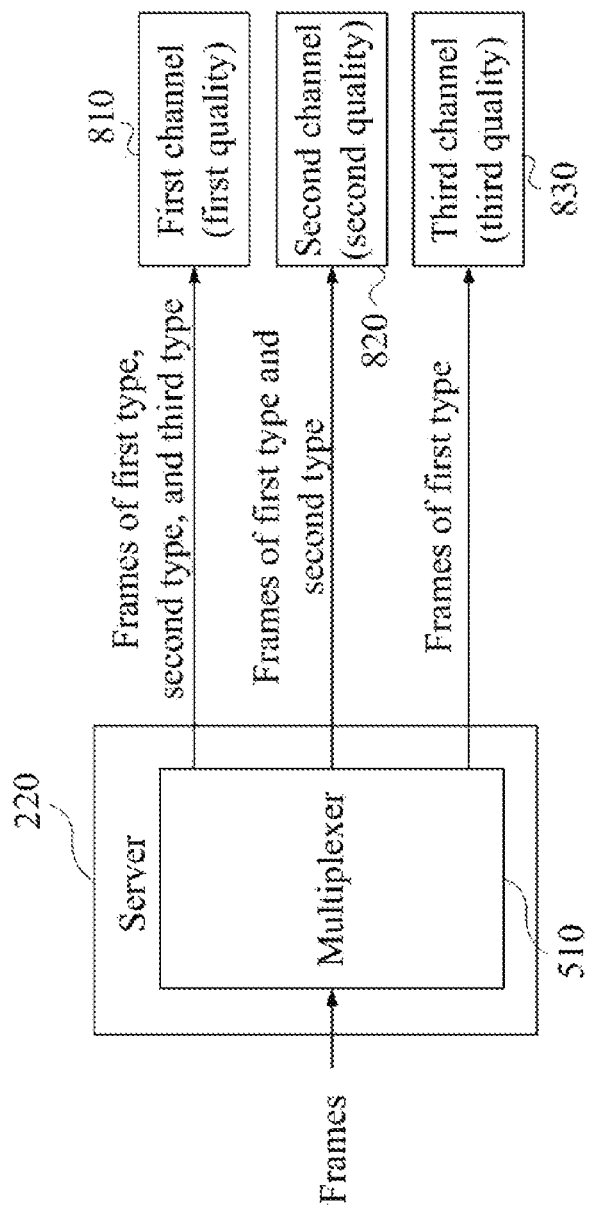
FIG. 8 illustrates an example of relaying a video stream live by controlling a quality of the video stream according to at least one example embodiment.

FIG. 8 illustrates an example of relaying a video stream by controlling a quality of a live video stream according to at least one example embodiment. FIG. 8 illustrates an example in which the server 220 receives frames of a video stream being transmitted live and inputs the received frames to the multiplexer 510 and the multiplexer 510 selects and outputs frames based on a type. Here, it is assumed that the received frames include frames of the first type, the second type, and the third type.

The multiplexer 510 may output and transmit all of the frames of the first type, the second type, and the third type through a first channel 810. In this case, the video stream having the first quality identical to the quality of the video stream transmitted from a sender may be serviced through the first channel 810.

Also, the multiplexer 510 may output and transmit frames of the first type and the second type through a second channel 820. In this case, the video stream having the second quality lower than the quality of the video stream transmitted from the sender may be serviced through the second channel 820. That is, since frames of the third type are excluded, a frame rate may decrease and accordingly, the quality of the video stream serviced through the second channel 820 may be relatively lower than the quality of the video stream transmitted from the sender.

Also, the multiplexer 510 may output and transmit the frames of the first type through a third channel 830. In this case, the video stream with the third quality including only the frames of the first type may be serviced through the third channel 830. The video stream with the third quality includes only the frames of the first type and thus, has a relatively lower quality than the video stream with the first quality or the video stream with the second quality.

As described above, the server 220 may service the video stream with the first quality through the first channel 810, the video stream with the second quality through the second channel 820, and the video stream with the third quality through the third channel 830 through multiplexing without transcoding. In this case, the viewer may view a video stream of a desired quality live through connection to a channel of the desired quality through a terminal of the viewer. For example, viewers present in a place where a current network state is poor may prefer a channel with a relatively low quality. Viewers present in a place where a network state is excellent may prefer a channel with a relatively excellent quality. A terminal may automatically select a channel based on a preference of a viewer, for example, a selection of the viewer, or a network state and may receive a video stream with a desired quality.

Figure 9:
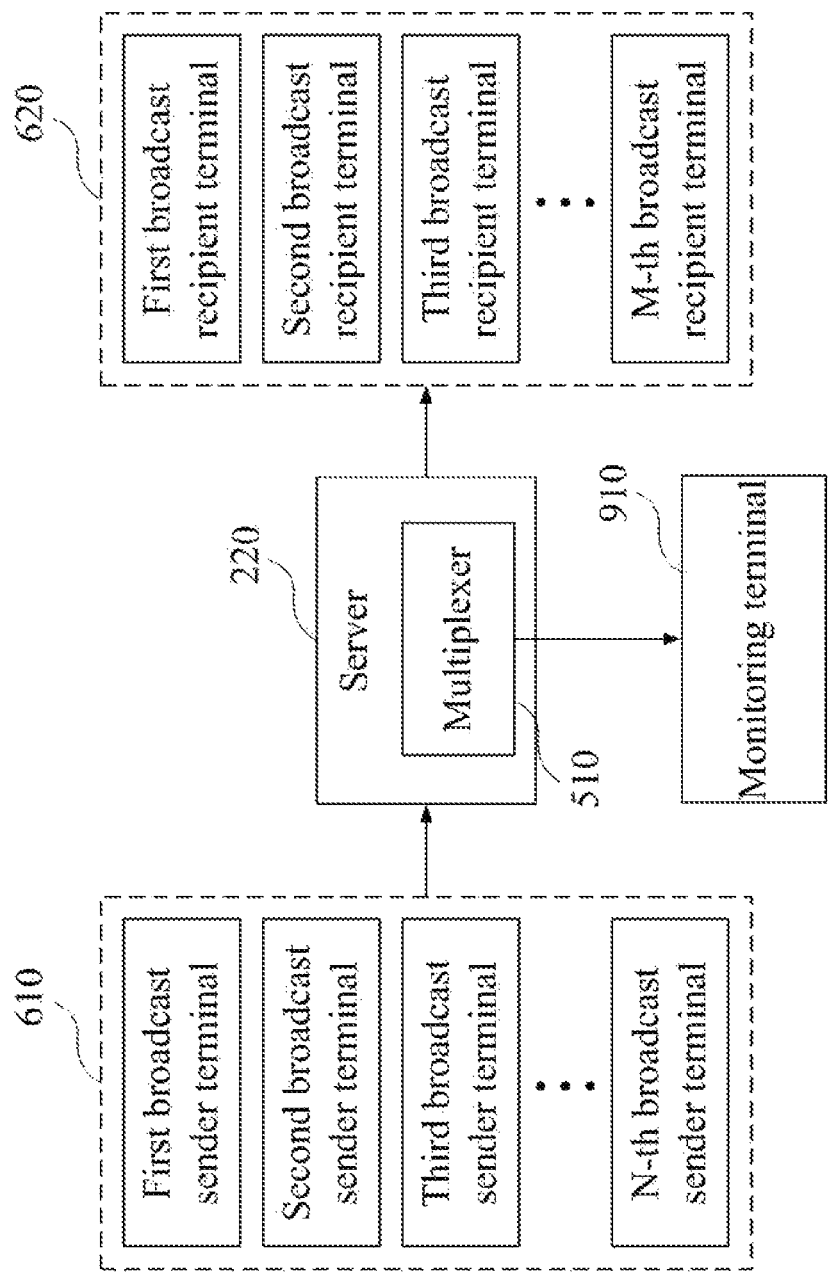
FIG. 9 illustrates another example of an environment of providing a video stream by controlling a quality of the video stream according to at least one example embodiment.

FIG. 9 illustrates another example of a system of providing a video stream by controlling a quality of the video stream according to at least one example embodiment. Similar to the example embodiment of FIG. 6, FIG. 9 illustrates an example of a live broadcast service environment in which the server 220 relays live video streams transmitted through N broadcast sender terminals 610 to M broadcast recipient terminals 620. Here, FIG. 9 further illustrates a monitoring terminal 910 configured to receive a live video stream transmitted from the server 220 and to monitor and/or inspect broadcast content, which differs from the example embodiment of FIG. 6. The monitoring terminal 910 may be run by a service provider side that provides a relay service of a live video stream or may be run by a separate monitoring company.

In this case, since a bandwidth of a network over which the server 220 communicates with the monitoring terminal 910 is limited, a number of live video streams providable from the server 220 to the monitoring terminal 910 is limited. For example, as a bitrate of a live video stream increases based on the bandwidth of the network, a number of live video streams providable in real time may decrease. Accordingly, the server 220 may select a preset number of live video streams based on a popularity of a corresponding live video stream measured based on a number of viewers, etc., and may transmit the selected number of live video streams to the monitoring terminal 910. The monitoring terminal 910 may monitor and/or inspect the preset number of live video streams.

Here, the example embodiment may decrease a bitrate by controlling a quality (e.g., a frame rate) of a live video stream using the aforementioned multiplexing, and may significantly increase the number of live video streams providable in real time from the server 220 to the monitoring terminal 910. For example, referring to FIG. 5, the live video stream with the first quality represented by the second box 520 includes 15 frames, that is, a total of 15 frames including a first I-frame to a B-frame before a second I-frame, for each pattern, and the live video stream with the third quality represented by the fourth box 540 includes a single frame, that is, an I-frame, for each pattern. Here, compared to the live video stream with the first quality, the live video stream with the third quality has a decreased bitrate according to a decrease in a frame rate. Therefore, if the server 220 transmits the live video stream with the third quality to the monitoring terminal 910 instead of transmitting the live video stream with the first quality, a number of live video streams transmittable in real time through the same bandwidth of the network significantly increases. That is, the number of live video streams capable of being monitored and/or inspected in real time by the monitoring terminal 910 significantly increases. Also, if it is possible to increase the number of live video streams with respect to the same bandwidth of the network, it may represent that it is also possible to reduce network cost, for example, network resources, used to monitor and/or inspect the same number of live video streams required.

To this end, after operation 720 of FIG. 7, the server 220 may transmit not the received frames of the video stream but the frames of the preset type being output to a monitoring terminal, for example, the monitoring terminal 910 of FIG. 9, configured to monitor or inspect video streams in real time in order to increase the number of video streams (or reduce network cost) providable to the monitoring terminal. The monitoring terminal 910 may determine a network state between the server 220 and the recipient terminals 620, based on a traffic delay and/or a bit error rate.

According to an example embodiment, monitoring or inspection may be processed at the server 220 in a program manner instead of using the separate monitoring terminal 910. For example, the server 220 may include a monitoring module for monitoring and/or inspection and a video stream of which a frame rate is adjusted through multiplexing may be input to the monitoring module. In this case, since a number of frames to be inspected by the monitoring module decreases, time and cost used to monitor and/or inspect a video stream may decrease. The monitoring module may be also referred to as a network state monitor. The server 220 may set the quality of the video streams to be transmitted to the recipient terminals 620 based the network state between the server 220 and the recipient terminals 620. The server 200 may selectively transmit I-frames, P-frames, and B-frames according to the set quality of the video streams.

In example embodiments, the recipient terminals 620 may determine a state of a network that connects the recipient terminals 620 to the server 220. In particular, the recipient terminals 620 may determine the network state based on a timestamp or a bit error rate of data that is received from the server 220 by the recipient terminals 620, determine a quality of video data to be received from the server 220 based on the network state, and transmit a request for the determined quality of video data to the server 220 so that the recipient terminals 620 receive video data having the requested quality, from the server 220. The recipient terminals 620 may automatically determine the quality of video data to be received from the server 200 according to a preset image quality setting, or may provide a user interface that allows a user to select one of a plurality of image qualities based on the current network statue. In another example, the recipient terminals 620 may send information of the network state to the server 220, and the server 220 may determine the quality of video data to be transmitted to the recipient terminals 620 based on the information of the network state. The server 220 may automatically select one of a plurality of image qualities based on the information of the network state, according to a preset image quality setting.

According to example embodiments, it is possible to generate a video having a plurality of qualities by controlling a quality of the video through multiplexing of frames of the video without transcoding the video.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A video quality control method comprising:
   receiving a video stream including frames that are classified into a plurality of frame types based on a reference relationship between the frames with regard to decoding, wherein the plurality of frame types comprises a first frame type indicating that a corresponding frame is independently decoded without referring to other frames, a second frame type indicating that the corresponding frame is decoded with reference to a preceding frame, and a third frame type indicating that the corresponding frame is decoded with reference to the preceding frame and a subsequent frame;
   selecting at least one frame type among the plurality of frame types; and
   controlling a quality of the video stream by multiplexing the frames included in the video stream with a first quality and outputting the frames of the first frame type, the second frame type, and the third frame type through a first channel, by multiplexing the frames included in the video stream with a second quality and outputting the frames of the first frame type and the second frame type through a second channel; and by multiplexing the frames included in the video stream with a third quality and outputting the frames of the first frame type through a third channel.

2. A non-transitory computer-readable record medium storing computer instructions that, when executed by a processor, cause the processor to perform the video quality control method of claim 1.

3. A video quality control method performed by a server, the video quality control method comprising:
   receiving a video stream including frames that are classified into a first frame type indicating that a corresponding frame is independently decoded without referring to other frames, a second frame type indicating that the corresponding frame is decoded with reference to a preceding frame, and a third frame type indicating that the corresponding frame is decoded with reference to the preceding frame and a subsequent frame;
   multiplexing the frames in at least two methods among a first method, a second method, and a third method, to:
      obtain a first multiplexed stream comprising the frames of the first frame type, the second frame type, and the third frame type, in the first method,
      obtain a second multiplexed stream comprising the frames of the first frame type and the second frame type without the frames of the third frame type, in the second method, and
      obtain a third multiplexed stream comprising the frames of the first frame type, without the frames of the second frame type and the third frame type, in the third method; and
   outputting at least two multiplexed streams in at least two different channels in parallel, among the first multiplexed stream, the second multiplexed stream, and the third multiplexed stream that correspond to the at least two methods among the first method, the second method, and the third method.

4. The video quality control method of claim 3, wherein each of the first multiplexed stream, the second multiplexed stream, and the third multiplexed stream starts with one of the frames of the first frame type.

5. The video quality control method of claim 1, wherein the receiving of the video stream comprises receiving the frames of the video stream that are encoded at a terminal of a sender and transmitted over a network, and
   the quality control method further comprises relaying the video stream of which the quality is controlled by transmitting the one or more of the frames having the selected at least one frame type through a channel accessible by a terminal of a viewer.

6. The video quality control method of claim 5, further comprising transmitting the one or more of the frames having the selected at least one frame type to a monitoring terminal for monitoring or inspecting the video stream.

7. A computer apparatus comprising:
   at least one processor configured to execute computer-readable instructions,
   wherein the at least one processor is configured to:
      receive a video stream including frames that are classified into a plurality of frame types based on a reference relationship between the frames with regard to decoding, wherein the plurality of frame types comprises a first frame type indicating that a corresponding frame is independently decoded without referring to other frames, a second frame type indicating that the corresponding frame is decoded with reference to a preceding frame, and a third frame type indicating that the corresponding frame is decoded with reference to the preceding frame and a subsequent frame,
      select at least one frame type among the plurality of frame types; and
      control a quality of the video stream by multiplexing the frames included in the video stream with a first quality and outputting the frames of the first frame type, the second frame type, and the third frame type through a first channel, by multiplexing the frames included in the video stream with a second quality and outputting the frames of the first frame type and the second frame type through a second channel; and by multiplexing the frames included in the video stream with a third quality and outputting the frames of the first frame type through a third channel.

8. The computer apparatus of claim 7, wherein the at least one processor is further configured to receive the frames of the video stream that are encoded at a terminal of a sender and transmitted over a network, and relay the video stream of which the quality is controlled by transmitting the one or more of the frames having the selected at least one frame type being through a channel accessible by a terminal of a viewer.

9. The computer apparatus of claim 8, wherein the at least one processor is further configured to transmit the one or more of the frames having the selected at least one frame type to a monitoring terminal for monitoring or inspecting the video stream.

10. The computer apparatus of claim 7, wherein the computer apparatus is included in a server for providing a video to a client device, wherein the first frame type, the second frame type, and the third frame type correspond to an intra frame (I-frame) type, a predictive frame (P-frame) type, and a bidirectional predictive frame (B-frame) type, respectively, wherein the at least one processor is configured to execute the computer-readable instructions to:

select the at least one frame type among the I-frame type, the P-frame type, and the B-frame type based on a network state between the server and the client device.

11. The server of claim 10, wherein the at least one processor is further configured to execute the computer-readable instructions to:

determine the network state based on information of a traffic delay provided from the client device.

12. The server of claim 10, wherein the at least one processor comprises a network state monitor configured to monitor the video stream and determine the network state based on the monitored video stream.

13. The server of claim 10, wherein the at least one processor is further configured to execute the computer-readable instructions to:

communicate with a monitoring terminal configured to monitor the video stream and determine the network state based on the monitored video stream; and receive information of the network state from the monitoring terminal.

* * * * *